United States Patent
Ito et al.

(10) Patent No.: US 6,488,788 B2
(45) Date of Patent: Dec. 3, 2002

(54) FLAT PLATE MEMBER WITH A GEAR PORTION AND A PROCESS FOR MAKING THE SAME

(75) Inventors: Haruki Ito, Kariya (JP); Yukio Isomura, Chita (JP); Naoyuki Yamada, Anjo (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/892,372

(22) Filed: Jun. 28, 2001

(65) Prior Publication Data

US 2002/0014291 A1 Feb. 7, 2002

(30) Foreign Application Priority Data

Jun. 28, 2000 (JP) ........................................ 2000-194795

(51) Int. Cl.$^7$ ............................. C22C 38/40; C21D 9/32
(52) U.S. Cl. ....................... 148/330; 148/586; 148/565; 148/644; 148/639
(58) Field of Search ................................. 148/330, 586, 148/565, 644, 639

(56) References Cited

U.S. PATENT DOCUMENTS

| | | | | |
|---|---|---|---|---|
| 4,957,702 A | * | 9/1990 | Fang et al. | 420/104 |
| 5,310,432 A | * | 5/1994 | Fukui et al. | 148/330 |
| 6,033,496 A | * | 2/2000 | Hisano et al. | 148/318 |
| 6,261,388 B1 | * | 7/2001 | Kubota et al. | 148/330 |

* cited by examiner

*Primary Examiner*—Deborah Yee
(74) *Attorney, Agent, or Firm*—Oblon, Spivak, McClelland, Maier & Neustadt, P.C.

(57) ABSTRACT

A flat plate member with gear portion is formed to a predetermined shape by pressing a flat steel raw material having a composition comprising, by weight, 0.10–0.18% C, less than 0.03% Si, 0.60–1.50% Mn, less than 0.020% P, less than 0.013% S, 0.001–0.004% B and the balance Fe with inevitable impurities, wherein quenching is performed on only the gear portion.

6 Claims, 2 Drawing Sheets

FLAT PLATE MEMBER WITH A GEAR PORTION AND A PROCESS FOR MAKING THE SAME

The present application is based an and claims priority under 35 U.S.C. § 119 with respect to Japanese Patent application No. 2000-194795 filed on Jun. 28, 2000, the entire content of which is incorporated herein by reference.

BACKGROUND OF THE INVENTION

1. Field of the Invention

The present invention relates to a flat plate member with a gear portion, and a process for making the same.

2. Description of the Background

A flat plate member with a gear portion is used, for example, as a driven gear of an arm type window regulator device for a vehicle, which is driven by a drive gear driven by a motor. In general, the driven gear of the arm type window regulator requires high surface hardness in order to maintain enough resistance against wear, and so the surface hardness thereof is Vickers hardness Hv 400 to 500. This driven gear is generally manufactured by the following steps. First, a pressing process such as punching or blanking is performed on a flat steel raw material, and thereby a flat plate member with a gear portion is formed. Then, carburisation quenching and tempering are performed on the entire flat plate member.

According to another method, the driven gear having high surface hardness can be manufactured using only a pressing process. In this method, the pressing process is performed on a steel raw material made of high tension steel, and thereby a flat plate member with a gear portion is formed.

In case carburisation quenching and tempering are performed on the entire driven gear plate after the driven gear plate is formed, however, since it takes long time for heat treatment, the manufacturing cost increases. Further, since the heat treatment is performed on the entire driven gear plate, and the content of carbon whose strain is large due to the heat treatment is high, a large strain is generated on the driven gear due to the heat treatment. As a result, the accuracy of the tooth form of the gear portion deteriorates and the noise generated during the operation of the arm type window regulator device increases.

Further, if the driven gear is formed by performing the pressing process on a steel raw material made of high tension steel, the accuracy of the tooth form of the gear portion does not deteriorate and the noise generated during the operation of the arm type window regulator device is reduced. However, since the raw material made of high tension steel is expensive, the manufacturing cost is increased.

SUMMARY OF THE INVENTION

It is, therefore, an object of the present invention to provide an improved flat plate member with a gear portion, in which the accuracy of the tooth form of the gear portion after quenching can be increased without increasing the manufacturing cost.

In order to achieve this objective, according to a feature of the invention there is provided a flat plate member with a gear portion, comprising a flat steel material having a composition comprising, by weight, 0.10–0.18% C, less than 0.03% Si, 0.60–1.50% Mn, less than 0.020% P, less than 0.013% S, 0.001–0.004% B and the balance Fe with inevitable impurities, wherein only the gear portion is quenched.

According to another feature of the invention there is provided a process for forming a flat plate member with a gear portion, comprising the steps of press forming a flat steel raw material having a composition comprising, by weight, 0.10–0.18% C, less than 0.03% Si, 0.60–1.50% Mn, less than 0.020% P, less than 0.013% S, 0.001–0.004% B and the balance Fe with inevitable impurities, to a predetermined shape having a gear portion; and quenching only the gear portion.

BRIEF DESCRIPTION OF THE DRAWINGS

Other features and advantages of the present invention will be more apparent and more readily appreciated from the following detailed description of a preferred exemplary embodiment of the present invention, taken in connection with the accompanying drawings, in which.

DETAILED DESCRIPTION OF THE PRESENT INVENTION

Hereinafter, an embodiment of a flat plate member with gear portion in accordance with the present invention will be described with reference to the attached drawings.

Figure 1:
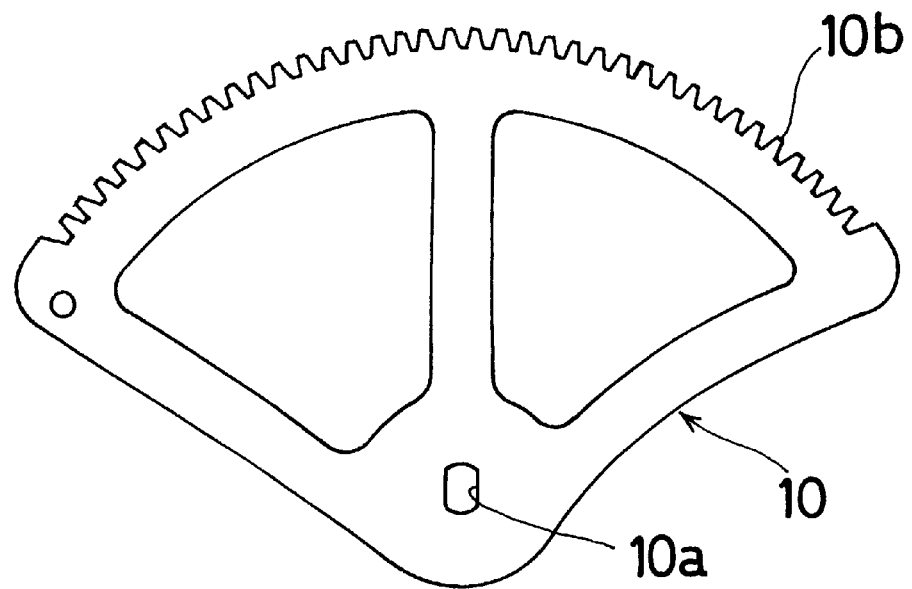
FIG. 1 illustrates an elevational view of a flat plate member with a gear portion in accordance with an embodiment of the present invention.

FIG. 1 shows an embodiment of a flat plate member with a gear portion in accordance with the present invention. In this embodiment, the present invention is applied to a driven gear 10 of an arm type window regulator device for a vehicle. The driven gear 10 is provided with a hole 10a and a gear portion 10b. A rotational center shaft (not shown) is connected to the hole 10a so as to be able to rotate with the driven gear 10 in a body. The gear portion 10b has an arc shape whose center is located at the hole 10a. The rotational center shaft (not shown) connected to the hole 10a also functions as a rotational center shaft of the arm (not shown) of the window regulator device, and the driven gear 10 is rotated with the arm in a body. The gear portion 10b of the driven gear 10 is engaged with a pinion gear (not shown) driven by a motor (not shown) and is rotated by the motor through the pinion gear.

The driven gear 10 is formed in a predetermined shape shown in FIG. 1 by performing a pressing process on a flat steel raw material, and then ultrasonic baking is performed on only the gear portion 10b. The thickness of the driven gear 10 is 3.2 mm and the diameter of the pitch circle of the gear portion 10b is 240 mm. The gear portion 10b extends in the circumferential direction over 120°. The flat steel raw material has a composition comprising, by weight, 0.10–0.18% C, less then 0.03% Si, 0.60–1.50% Mn, less than 0.020% P, less than 0.013% S, 0.001–0.004 B and the balance Fe with inevitable impurities. Carbon is required for securing the hardness after quenching and more than 0.1% wt is indispensable. However, as the content of C increases, the forming characteristic deteriorates and the strain after quenching increases. Therefore, the upper limit of the content of C is limited to 0.18% wt.

Mn is required for increasing the hardness of the steel material and for improving the quenching characteristic, and more than 0.6% wt is indispensable. However, as the content of Mn increases, the ductility of the steel material deteriorates. Therefore, the upper limit of the content of Mn is limited to 1.50% wt.

B is required for improving the quenching characteristic and more than 0.001% wt is indispensable. However, as the content of B increases, harmful manufacturing defects are easily generated. Therefore, the upper limit of the content of B is limited to 0.004% wt. It is desirable to decrease the content of Si, P and S. However, Si, P and S are present in the manufacturing of the steel.

In the ultrasonic baking of the gear portion 10b, the temperature of the gear portion 10b is first raised from the room temperature to 900° C. by heating for 3 seconds at an ultrasonic heating frequency of 500 KHz and a heating power input of 30 Kw. Immediately after heating, the temperature of the driven gear 10 is rapidly reduced to 200° by immersion in water-soluble quenching coolant for 5 seconds. In this embodiment, tempering or annealing is not performed, but tempering or annealing may be performed. Further, the frequency can be adjusted in the range of 200 to 500 KHz and the input power can be also adjusted in the range of 34 to 50 Kw. Further, the ultrasonic coil has an arc shape and the gear portion 10b is heated with the arc shaped ultrasonic coil secured to the outer circumferential side of the gear portion 10b of the driven gear 10.

The chemical components and the surface hardness of the gear portion after the ultrasonic baking of examples No. 1 to No. 4 of the present invention and the chemical components and the surface hardness of the gear portion after the ultrasonic baking of a Comparative example are shown in Table 1.

TABLE 1

| | | Chemical components (% by weight) (the balance: Fe and with inevitable impurities) | | | | | | Surface hardness |
|---|---|---|---|---|---|---|---|---|
| No. | | C | Si | Mn | P | S | B | (Hv) |
| Example | 1 | 0.16 | 0.02 | 0.82 | 0.018 | 0.011 | 0.002 | 483 |
| | 2 | 0.16 | 0.02 | 0.85 | 0.018 | 0.012 | 0.003 | 467 |
| | 3 | 0.13 | 0.02 | 0.68 | 0.014 | 0.003 | 0.002 | 410 |
| | 4 | 0.12 | 0.02 | 1.20 | 0.011 | 0.008 | 0.001 | 424 |
| Comparative Example | 1 | 0.07 | 0.13 | 0.38 | 0.029 | 0.007 | — | 307 |

In the Table 1, the surface hardness is represented by Vickers hardness (Hv) measured under a load of 300 g. In this embodiment, as shown in Table 1, the surface hardness of the gear portion is Hv 400 to Hv 500.

Figure 2:
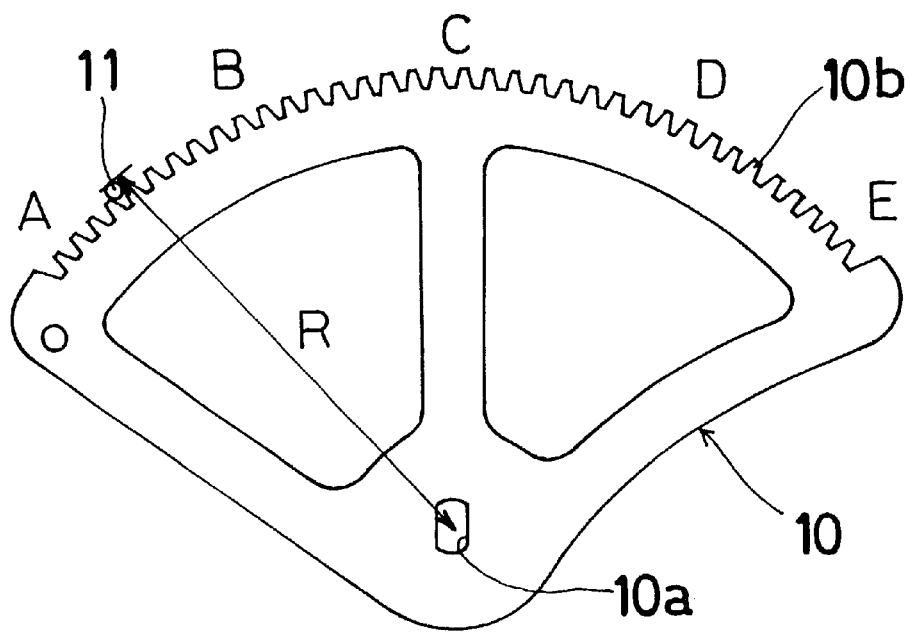
FIG. 2 illustrates an elevational view of a flat plate member with a gear portion, which shows a method of measurement of tooth form accuracy in accordance with an embodiment of the present invention.
Figure 3:
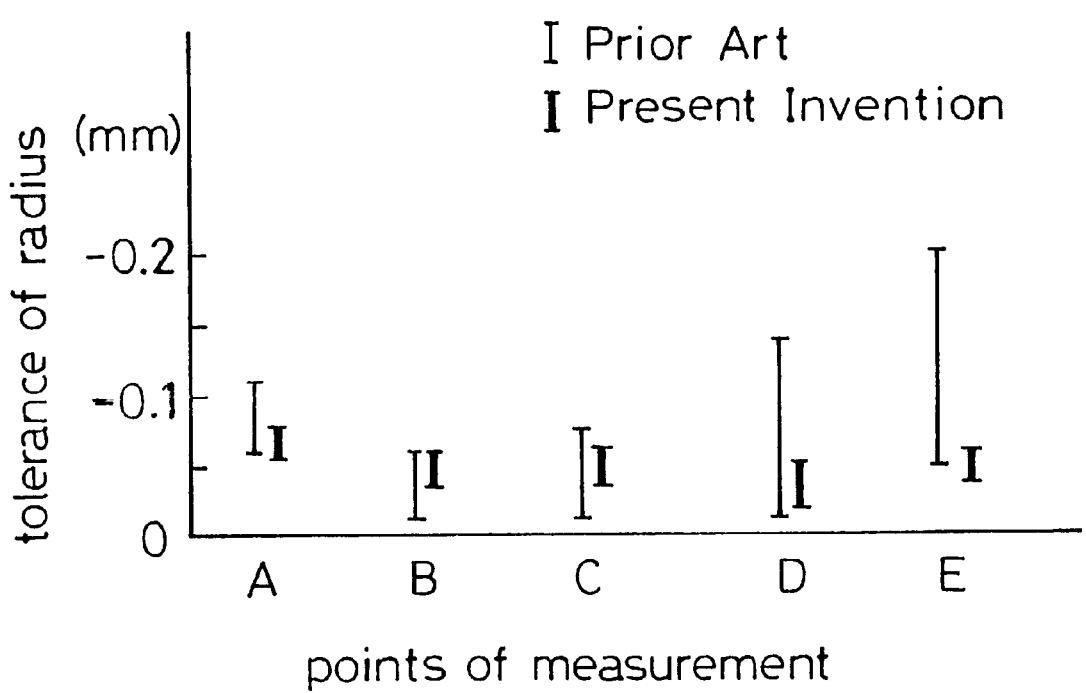
FIG. 3 is a graph which shows a result of measurement of a tooth form accuracy in accordance with an embodiment of the present invention.

FIG. 2 shows a method of measurement of a tooth form accuracy of the completed driven gear 10 and FIG. 3 shows a result of the measurement. Referring to FIG. 3, a standard pin 11 having a round cross-section is pressed into the trough between two adjacent teeth of the gear portion 10b of the driven gear 10, and the outer circumferential surface of the standard pin 11 is contacted to the surface of the adjacent two gears. The length between the rotational center of the driven gear 10 and the outermost diametric point of the standard pin 11, namely the radius R shown in FIG. 2 is measured under the condition in which the outer circumferential surface of the standard pin 11 contacts the surface of the adjacent two gears. The points of measurement are the 5 points shown by A to E in FIG. 2. Twenty pieces according to the embodiment of the present invention in which the driven gear 10 shown in FIG. 1 is formed by performing the pressing process to the flat steel raw material corresponding to the example No. 1 and in which ultrasonic baking is performed on only the gear portion 10b are measured. Further, 20 pieces of the comparative prior driven gear in which carburisation quenching and tempering are performed on the whole plate are measured. The result of these measurement are shown in FIG. 3. As shown in FIG. 3, in comparison with the prior driven gear, the tolerance of radius, namely the difference between the measured radius and the standard radius of the present invention is small and the scattering of the tolerance of radius of the present invention is also small. Accordingly, the noise generated in the operation of the arm type window regulator device is decreased.

In the above embodiment, the present invention is applied to the driven gear of the arm type window regulator device. However, it is possible to apply the present invention to, for example, a gear and a pawl of a seat reclining device for a vehicle, a gear of a parking brake device for a vehicle and a gear of other devices.

According to the present invention, the content of C which is required for increasing the surface hardness is reduced to 0.10–0.18% wt in order to decrease the strain after quenching. Even though the content of C is small, in order to increase the surface hardness after quenching, the content of B is set to 0.001–0.004% and the content of Mn is set to 0.60–1.50%. As a result, the surface hardness of the gear portion after quenching becomes Hv 400 to Hv 500. Further, since the content of C is small and the quenching is performed on only the gear portion, the accuracy of a tooth form of the gear portion, is maintained at a higher level. Further, the steel raw material having the above composition is not expensive and it does not take long time for heat treatment because the ultrasonic baking or laser quenching is performed on only the gear portion. Therefore, the manufacturing cost is decreased.

The invention has thus been shown and description with reference to specific embodiments, however, it should be understood that the invention is in no way limited to the details of the illustrated structures but changes and modifications may be made without departing from the scope of the appended claims.

What is claimed is:

1. A flat plate member with a gear portion, comprising a flat steel material having a composition comprising, by weight, 0.10–0.18% C, less than 0.03% Si, 0.60–1.50% Mn, less than 0.020% P, less than 0.013% S, 0.001–0.004% B and the balance Fe with inevitable impurities, wherein only the gear portion is quenched.

2. The flat plate member as set forth is claim 1, wherein the surface hardness of the quenched gear portion is Hv 400 to Hv 500.

3. The flat plate member as set forth is claim 2, wherein ultrasonic baking is performed on only the gear portion.

4. A process for forming a flat plate member with a gear portion, comprising the steps of:

press forming a flat steel raw material having a composition comprising, by weight, 0.10–0.18% C, less than 0.03% Si, 0.60–1.50% Mn, less than 0.020% P, less than 0.013% S, 0.001–0.004% B and the balance Fe with inevitable impurities, to a predetermined shape having a gear portion; and quenching only the gear portion.

5. The process as set forth is claim 4, wherein the quenching is performed such that the surface hardness of the gear portion after quenching is Hv 400 to Hv 500.

6. The process as set forth is claim 5, further comprising a step of ultrasonic baking only the gear portion.

* * * * *